(12) United States Patent
Chaudhry (10) Patent No.: US 6,567,103 B1
(45) Date of Patent: May 20, 2003

(54) GRAPHICAL SEARCH RESULTS SYSTEM AND METHOD

(75) Inventor: Abdul Chaudhry, Sunnyvale, CA (US)

(73) Assignee: Verity, Inc., Sunnyvale, CA (US)

( * ) Notice: Subject to any disclaimer, the term of this patent is extended or adjusted under 35 U.S.C. 154(b) by 399 days.

(21) Appl. No.: 09/630,449

(22) Filed: Aug. 2, 2000

(51) Int. Cl.[7] .............................................. G06F 12/00
(52) U.S. Cl. ...................... 345/738; 345/739; 345/968; 707/3; 707/10; 707/5
(58) Field of Search ............................... 345/730, 825, 345/968, 776, 738, 739; 707/3, 10, 2, 5

(56) References Cited

U.S. PATENT DOCUMENTS

| | | | | |
|---|---|---|---|---|
| 5,781,904 A | * | 7/1998 | Oren et al. ................. | 707/100 |
| 5,982,369 A | * | 11/1999 | Sciammarella et al. ..... | 345/835 |
| 6,012,053 A | * | 1/2000 | Pant et al. ................ | 707/3 |
| 6,067,539 A | * | 5/2000 | Cohen ....................... | 707/2 |
| 6,275,229 B1 | * | 8/2001 | Weiner et al. ............. | 345/764 |
| 6,434,556 B1 | * | 8/2002 | Levin et al. ............... | 707/5 |

* cited by examiner

Primary Examiner—John Cabeca
Assistant Examiner—Shawn M. Becker
(74) Attorney, Agent, or Firm—Gray Cary Ware & Freidenrich LLP (57) ABSTRACT

A system and method of creating a graphical presentation, such as a video, based on surfing the results of a web search. The graphical presentation may be constructed from the results of a search wherein each search result represents a URL and each URL is rendered as a graphical image of a web page (a frame) and stored in a file. When the file is viewed, it is displayed in a sequence of rendered frames wherein each frame is displayed for a variable, predetermined amount of time based on the relevance of the particular search result.

27 Claims, 6 Drawing Sheets

GRAPHICAL SEARCH RESULTS SYSTEM AND METHOD

BACKGROUND OF THE INVENTION

This invention relates generally to a system and method for displaying search results generated from a search to a user and in particular to a system and method for visually displaying the search results wherein the time that a graphical representation of a search result is viewed is based on a ranking of the search result.

Typically, a piece of search software or search engine may accept a user's search query, process the search query and then return a list of the search results, such as web sites or documents, that match the query. In most typical search engines, the search results are ranked according to some predetermined ranking metric. Using the ranking results, the search results presented to the user are listed in descending order with the most highly ranked (often associated with most relevant) web sites/documents first and the lowest ranked web sites/documents last. The ranking permits the user to quickly review the most relevant web sites/documents without having to surf through the entire search results. The ranking typically may reflect the relevance of the document/web site to the query term. For example, the document/web site with the most occurrences of the query term may be ranked as highly relevant while a document with a single occurrence of the query term may be the lowest ranked document/web site.

The ranking of the search results hopefully reduces the total number of search results that the user must review since the user hopefully find the appropriate search results more rapidly. However, the user must still click on each of the matching web sites/documents and review them (e.g., surf through the search results) in order to determine the actual usefulness of the returned search results. The process of surfing through the search results is very slow since the user must select each web page/document to review, launch the appropriate software application, such as Word or a browser, and then look at the search result. Other conventional search engines may present the search results in a slightly different format, but still typically provide the user with textual information about each search result. For example, some search engines may return a map of different terms that are related to the query term in order to help the user navigate through the search results. However, none of the above conventional search engines/systems permit a user to graphically view each web site/document as part of the search results. It is therefore desirable to provide a user with a graphical representation of each search result (web page or document) and to rank those graphical search results so that a user may more easily review and analyze the search results. Thus, it is desirable to provide a graphical search results system and method and it is to this end that the present invention is directed.

SUMMARY OF THE INVENTION

In accordance with the invention, a graphical search results system is provided. The system permits the user to view a graphical representation of the search results so that the user is more able to rapidly locate a pertinent web page or document. In more detail, the system creates, stores and graphically renders web-based "search engine results" or "search engine results of preconstructed queries known as Agents" as an ordered sequence of graphical frames separated by a predetermined, variable time interval. Each frame may be a visible portion of a web page to be rendered and shown to the user. The actual predetermined time interval for the display of each frame is determined based on the relevance or score of the hyperlink (search result) to which the frame refers.

In accordance with the invention, the system provides "Surf Results" to the user. The Surf Results are a rendered image provided to the end user as if he/she was surfing through the results of a search in a web browser. The surfing may be a timed sequence of web pages that emulate a user's interaction with a web browser. The system may include an ability to "fast-forward" or "reverse" or "speed-up" or "slow-down" or "pause" the sequence of frames being shown to the user which is similar functionality to a VCR.

Thus, in accordance with the invention, a system and method for visually displaying a graphical presentation of the actual search results based on a search query is provided. In accordance with the invention, a graphical frame representing the search result is generated and a predetermined display time for each search result is determined to determine the time during which the graphical frame is to be displayed based on a score associated with the particular search result. The graphical frames are combined to form a graphical presentation of the search results. The graphical presentation of the search results is then displayed to a user wherein each graphical frame of the graphical presentation is displayed to the user for the predetermined display time associated with that graphical frame so that the user sees the more relevant search results for a longer period of time.

In accordance with another aspect of the invention, a system and method for generating a graphical presentation of search results based on a search query is provided in which a graphical frame is generated for each search result. Then, for each search result, a predetermined display time is determined during which the graphical frame is to be displayed based on a score associated with the particular search result. Finally, the graphical frames are combined together to form a graphical presentation of the search results, wherein each graphical frame of the graphical presentation is displayed to the user for the predetermined display time associated with that graphical frame so that the user sees the more relevant search results for a longer period of time.

The foregoing features and advantages of the invention will become better understood by reference to the following detailed description, when taken in conjunction with the accompanying drawings.

DETAILED DESCRIPTION OF A PREFERRED EMBODIMENT

The invention is particularly applicable to the graphical display of web pages from a web-based search and it is in this context that the invention will be described. It will be appreciated, however, that the system and method in accordance with the invention has greater utility, such as to other types of search results, such as documents and it may be implemented using a variety of different computer systems. Prior to describing the details of the invention, an overview of the invention will be provided.

A graphical search results system is described wherein the system creates, stores and renders a web-based "search engine results" or "search engine results of preconstructed queries known as Agents" as an ordered sequence of frames (wherein each frame represents the web page/document from one or the search results) separated by a predetermined, variable time interval. In a preferred embodiment, the system may be implemented using a client/server system. In accordance with the invention, each frame is a visible portion of a web page to be rendered. The predetermined variable time interval to display each frame is based on the relevance or score of the hyperlink (search result) to which the frame refers. In accordance with the invention, the system provides "Surf Results" which is a graphical rendering to the end user of the frames as if he/she was surfing through the results of a search in a web browser wherein the frames are provided as a timed sequence of web pages emulating an interaction with a web browser. The system may also permit the user to "fast-forward", "reverse", "speed-up", "slow-down" or "pause" the sequence of frames similar to a VCR. To better understand the invention, a conventional search engine and search engine user interface will be described.

Figure 1:
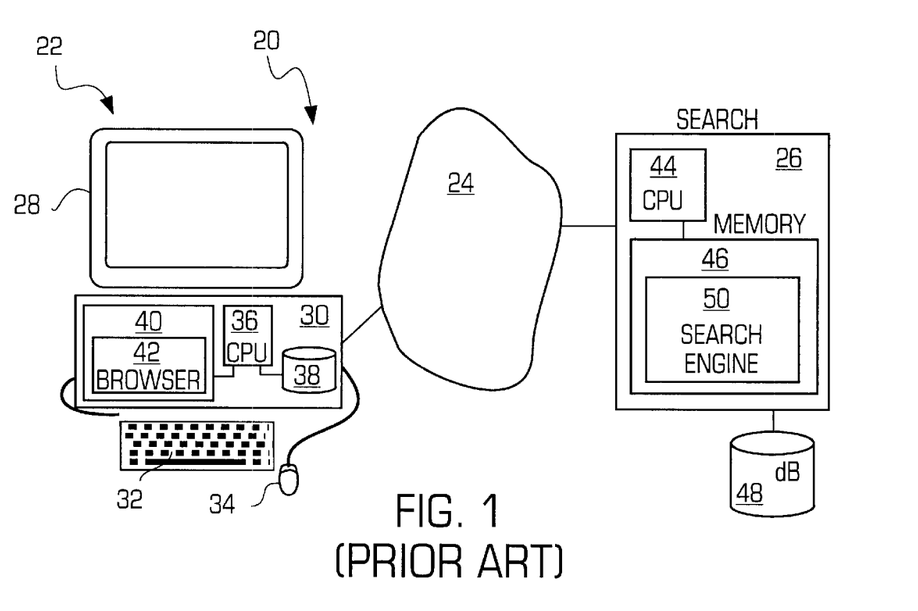
FIG. 1 is diagram illustrating a conventional client/server search system.

FIG. 1 is diagram illustrating a typical client/server search system 20. The system may include one or more client computers 22 (only one is shown in the diagram for clarity) connected over a computer network 24, such as local area network, wide area network or the like and in a preferred embodiment, the Internet and World Wide Web, to a remotely located server computer 26. This arrangement is a typical client/server type computer system. Each client computer 22 may include a display device 28, such as a cathode ray tube or liquid crystal display, a chassis 30 and one or more input/output devices connected to the chassis, such as a keyboard 32 and a mouse 34, that permit a user to interact with the client computer. For example, the user may enter a search query into the client computer by typing the query using the keyboard. Each client computer may further include a central processing unit (CPU) 36 that controls the operation of the client computer, a persistent storage device 38, such as a hard disk drive, a tape drive, an optical drive and the like, for the permanent storage of software being executed by the CPU and a memory 40, such as semiconductor DRAM, for temporarily storing software while it is being executed by the CPU as is well known. In the client computer shown, the memory is loaded with a browser software application 42, such as Netscape® Navigator®, that permits the user of the client computer, using the hypertext transfer protocol (HTTP), to log onto a web site, to download a web page from the web site and to send data to the server as is well known.

Figure 2:
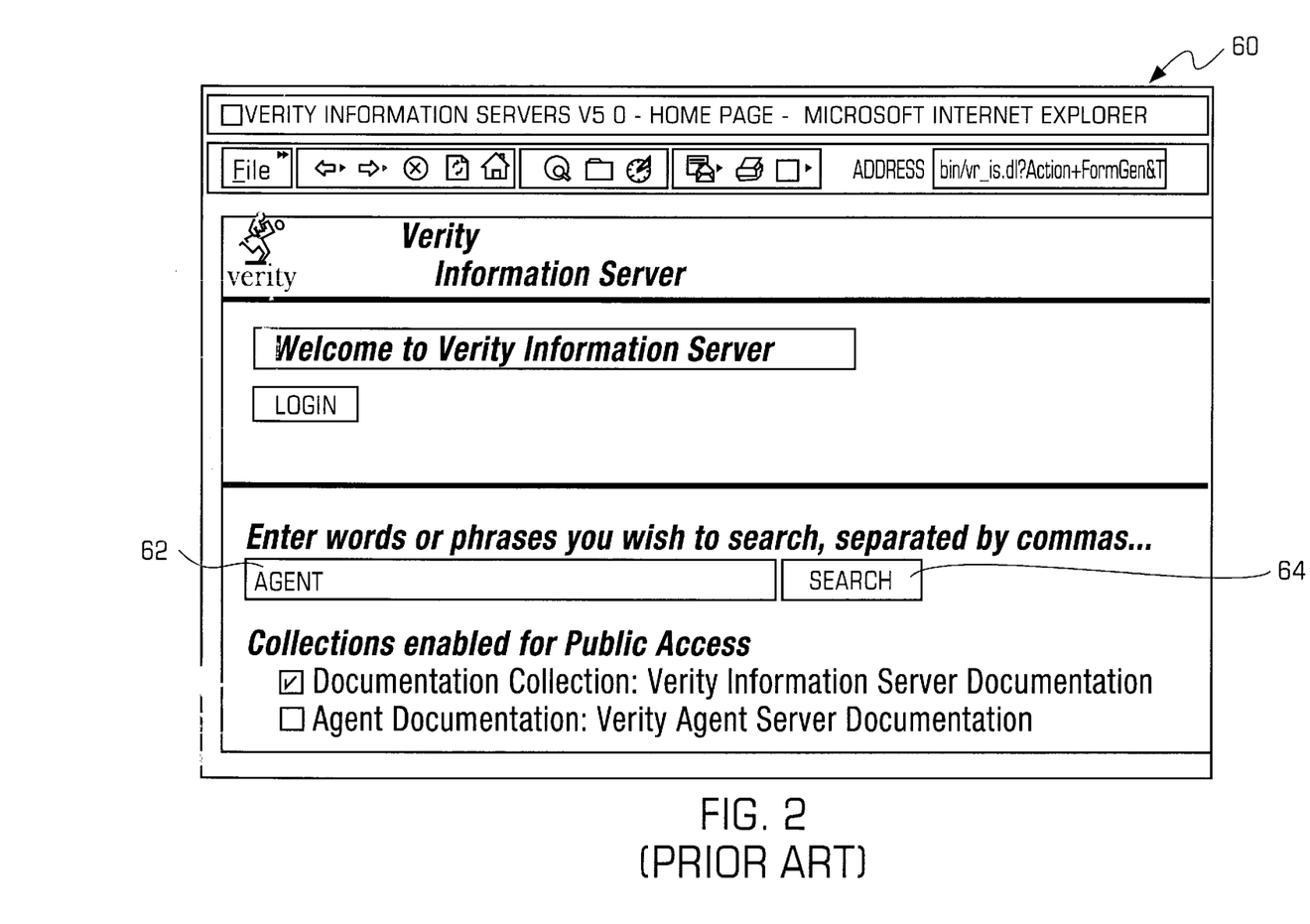
FIG. 2 is a diagram of a conventional search engine user interface where a user types a query and hits a button to search.

The server 26 may include a CPU 44, a memory 46 and a persistent storage device 48 that may store, among other data, a database. The memory may store a search engine software application 50. In operation, the user may log onto the server using the HTTP protocol and be presented with a web page that includes a text entry area for a query. An example of a typical query entry web page 60 is shown in FIG. 2. As shown in FIG. 2, the search query page may permit the user to enter one or more query terms into a text entry area 62. In the example shown in FIG. 2, the user has entered "Agent" into the query area. The user may then click on a "Search" button 64 in order to transmit the query to the server.

Figure 3:
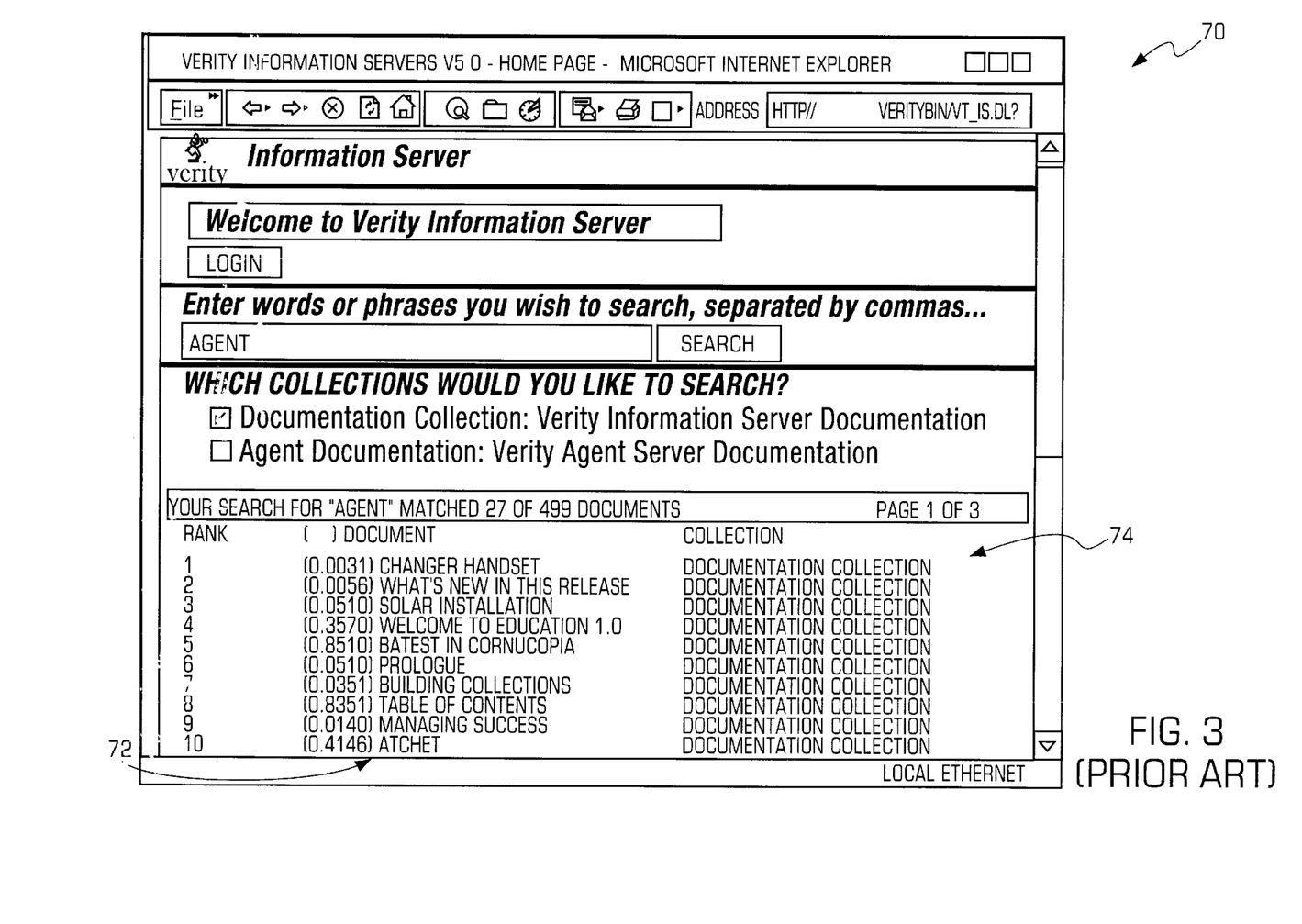
FIG. 3 is a diagram of a conventional search results user interface where a user would have to manually surf through each of the individual documents to find the relevant set of documents or the relevant document.

In response to the query, the CPU 44 of the server executes the search engine software 50 which in turn performs a database search of the database to locate web pages/documents that match the query of the user. The search engine may then formulate the results of the search into a list of search results and a web page with the list of search results is communicated back to the user. An example of the typical search results web page 70 is shown in FIG. 3. The user may then view the list of search results and attempt to locate the desirable matches. In the example shown in FIG. 3, the search page may include a ranking 72 for each match along with a description 74 of the location of the match. In this example, the matches are all documents found in one or more different collections of documents. Thus, with a typical search engine, the user must then manually browse through the search results in an attempt to locate pertinent documents. For example, the user may click on each search results which will launch a viewer to view the search result. However, the search system in accordance with the invention may present the search results to the user as a video containing one or more images of each document that matched the query (a frame for each search result) wherein the time that each frame is displayed to the user is dependent upon the relevance of that frame relative to the other frames as will be described below in more detail. Now, the search system in accordance with the invention will be described.

Figure 4:
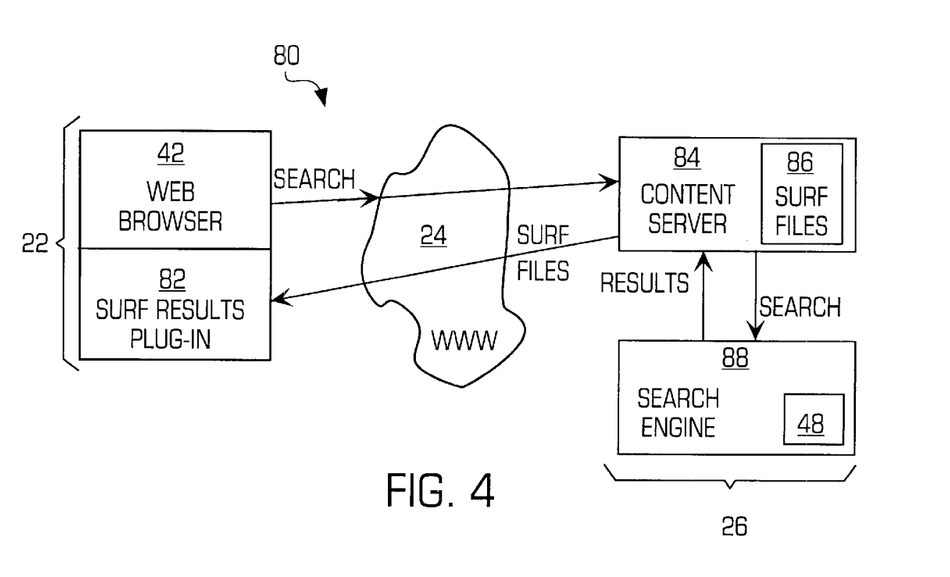
FIG. 4 is a diagram illustrating the graphical search system in accordance with the invention.

FIG. 4 is a diagram illustrating a graphical search system 80 in accordance with the invention that may include the one or more client computers 22 connected via the computer network 24 to the search server 26 similar to a typical search engine. In accordance with the invention, however, the search system 80 has a number of differences. For example, the client computer may include the typical browser 42, but it may also include a surf results plugin 82. The plugin 82 may operate in conjunction with the browser 42 to permit the user to graphically browse the search results in accordance with the invention as will be described in more detail below.

In addition to the typical server elements shown in FIG. 1, the server 26 shown in FIG. 4 may also include a content server 84 that contains one or more surf files 86 (which are images of each document/web page that matches the user's query as described in more detail below) and a search engine 88. As above, the search engine may include the search database 48. The operation of the search system in accordance with the invention will now be described with reference to FIG. 5.

Figure 5:
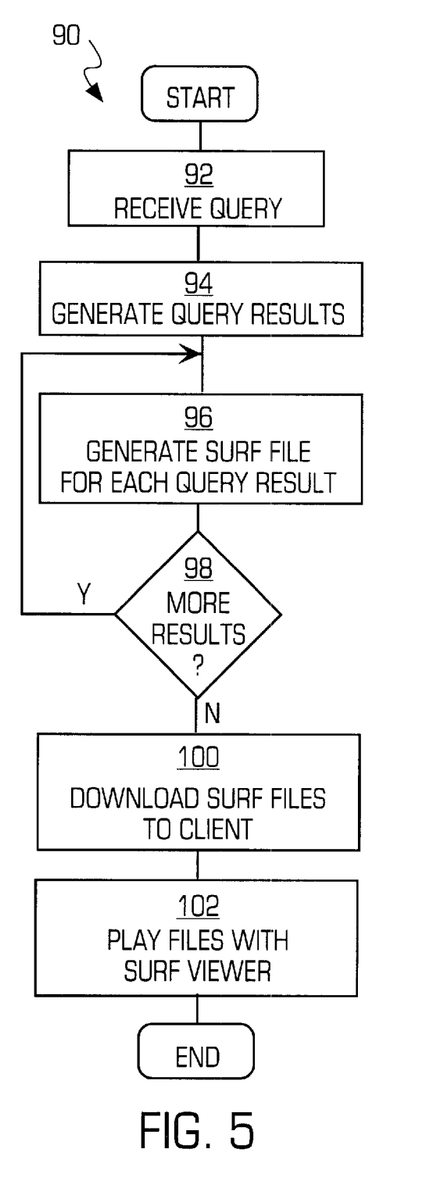
FIG. 5 is a flowchart illustrating a method for graphically displaying search results in accordance with the invention.

FIG. 5 is a flowchart illustrating a method 90 for graphically displaying search results in accordance with the invention. In operation, the user may enter a query into a web page such as that shown in FIG. 2 and transmit the search query to the server 26 as is well known in step 92. The content server 84 may forward the query to the search engine 88 that executes the search and returns the search results of the search in step 94. The content server 84 may then convert each search result (web page or document) into an image in step 96 and store the image as a surf file 86. Each surf file may also store a predetermined display time for the image wherein the predetermined display time for the image is dependent upon the relevance of the search result as described in more detail below.

If there are more search results, the method loops back to step 96 until all of the search results are converted into surf files. Next, the surf files of the search results are stitched together in the form of a video of the surf files and then downloaded to the client computer in step 100. In step 102, the surf results plugin in the browser is activated and the video is shown to the user. Thus, the user may graphically browse through the search results. To make the search results more focused, each surf file for each search result may be shown to the user for a variable, predetermined time during the video. The predetermined time for display of a particular surf file may be based on a relevance score of the search result corresponding to the surf file. A method for determining that variable, predetermined display time for each frame of the video in accordance with the invention will now be described.

Figure 6:
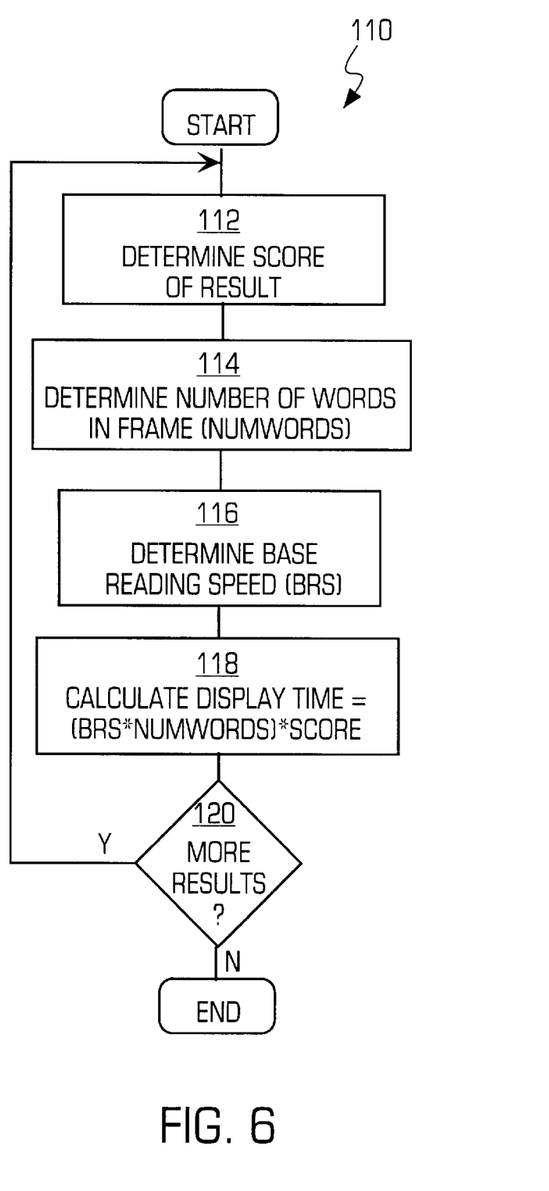
FIG. 6 is a flowchart illustrating a method for determining the display time for a search result in accordance with the invention.

FIG. 6 is a flowchart illustrating a method 110 for determining the display time for a search result in accordance with the invention. In particular, in step 112, the system may determine the score of the search result (SCORE) in a well known manner. For example, the SCORE value may be based on the relevance of the document that a search engine assigns to the document as a weight wherein 1.00 is the highest score and 0.01 is the lowest score. In step 114, the number of words in the image represented on the frame is determined (NUMWORDS). Next, the base reading speed (BRS) per second of the user is determined in step 116. In particular, the default BRS may be, for scanning web pages for example, 0.075(60 s/800 words) words per second and for reading web pages is typically 0.25 (60 s/240words) words per second based on some well known research regarding the reading speed of typical people. The system may also permit the particular user to indicate that the default BRS is too low or too high so that the BRS may be customized for a particular user. Using the SCORE, NUMWORDS and BRS values, the predetermined display time for the particular search results may be determined in step 118. In a preferred embodiment, the display time=(BRS*NUMWORDS)*SCORE. The system may then determine if there are more search results in step 120 and loop back to step 112 to determine the display time for the additional search results. Otherwise, the method for determining the predetermined display time is completed. Now, several examples of the graphical search results in accordance with the invention will be described.

Figure 7:
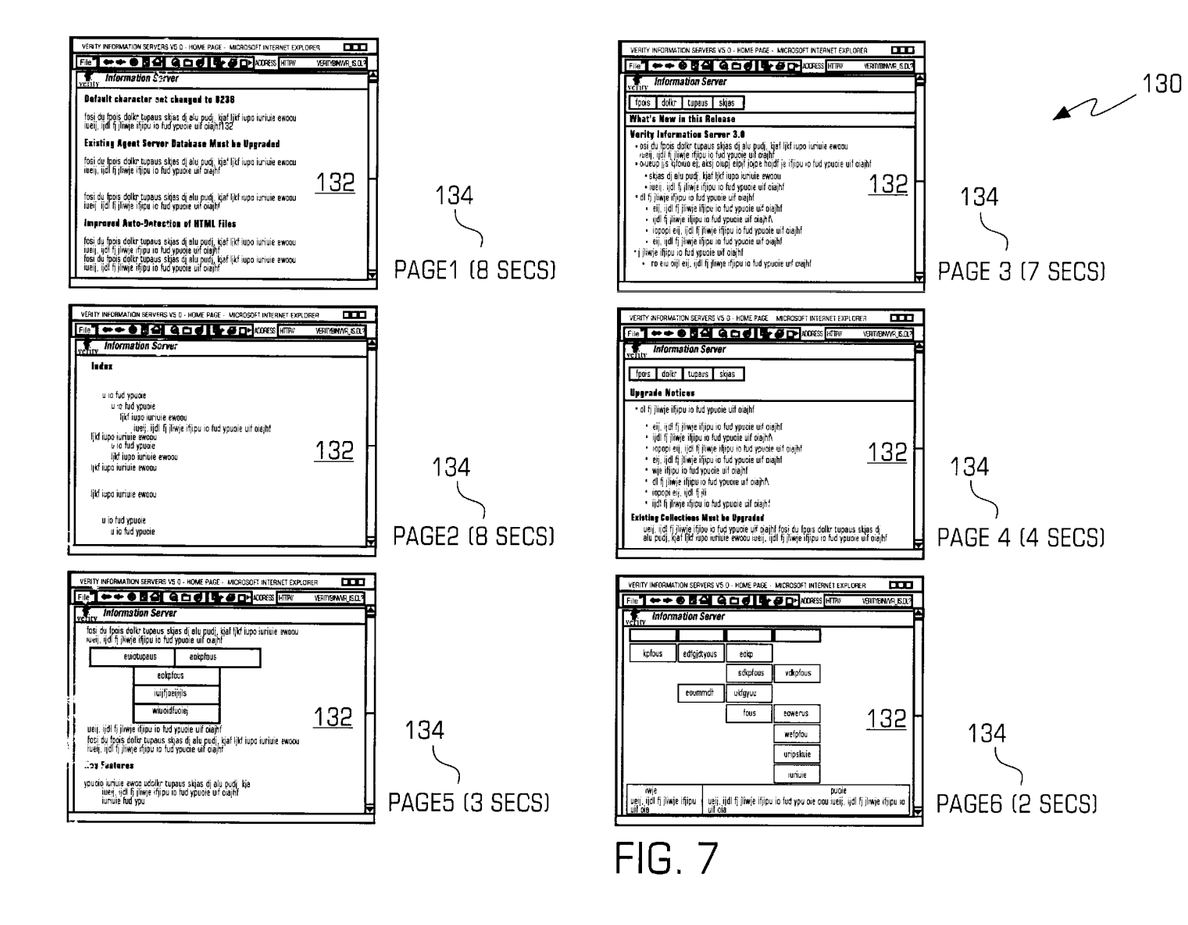
FIG. 7 is a diagram illustrating an example of a graphical presentation in accordance with the invention that includes one or more Surf Results.

FIG. 7 is a diagram illustrating a graphical presentation 130 of one or more surf files that may be downloaded to the user for viewing using the plugin as described above. In particular, the graphical presentation may include a sequence of one or more images 132 of each search result (e.g., a rendered page) wherein each page is marked with a display time interval 134 based on the score of the document, paragraph, sentences and words. Each image may also include a link to the original URL (an embedded URL) so that, as the user is viewing the particular frame, he may click on the URL in order to launch the current web page as is well known. The generating of an image of a web page in this example is well known. The images may then be stitched together into a series of frames that are shown to the user using the plugin wherein the display time for each frame is variable and determined as described above. Now, an example of the surf viewer plugin that may be used to view the surf file will be described.

Figure 8:
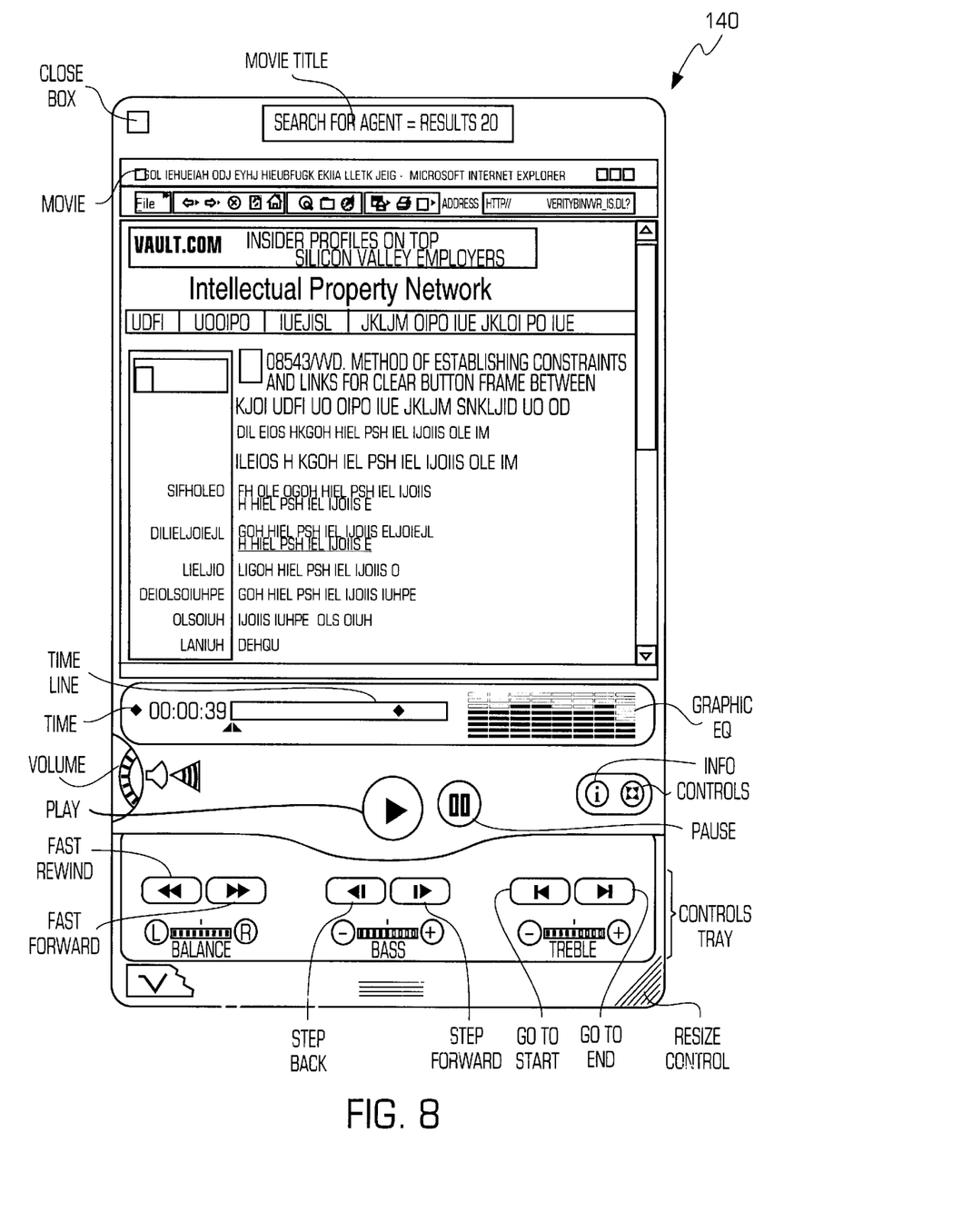
FIG. 8 is a diagram of a surf viewer plugin in accordance with the invention that may be used to view surf results.

FIG. 8 is a diagram of an example of a surf viewer plugin user interface 140 in accordance with the invention that may be used to view surf results. As shown, the user may view each frame representing each search result for a predetermined period of time based on the relevance of the web page. The plugin may include various control buttons that permit the user to control the display of the frames. For example, the plugin may permit the user to fast rewind the frames, fast forward the frames, step back one frame, step forward one frame, go back to the first frame and go to the last frame. In viewing the frames, the user is viewing the search results in a graphical manner in accordance with the invention. The controls described above permits the user to manually control the display of the frames as desired similar to a VCR. Thus, for example, a user may see an interesting frame and go back to it. The plugin may also include other control that permit the user to control the presentation of the frames, such as the sound (a balance control, a treble control and a bass control). In the example shown in FIG. 8, the frames may be stitched together into a digital movie.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A method for visually displaying a graphical presentation of the actual search results based on a search query, the method comprising:

generating, for each search result, a graphical frame representing the search result;

determining, for each search result, a predetermined display time during which the graphical frame is to be displayed based on a score associated with the particular search result;

combining the graphical frames to form a graphical presentation of the search results; and displaying the graphical presentation of the search results to a user wherein each graphical frame of the graphical presentation is displayed to the user for the predetermined display time associated with that graphical frame so that the user sees the more relevant search results for a longer period of time.

2. The method of claim 1, wherein determining the predetermined display time for each frame further comprises determining a default base reading speed corresponding to the speed that a user reads a web page, determining the number of words that appear in the particular frame, determining the score of the search result represented by the frame and combining the base reading speed, the number of words in the frame and the score of the frame to determine the predetermined display time for the frame.

3. The method of claim 1 further comprising executing a search based on a user query wherein executing the search further comprises retrieving the search results based on the query, extracting the web page corresponding to each search result as an image, and storing the images of the web pages and the predetermined display time for each image into a file.

4. The method of claim 3, wherein displaying the graphical presentation comprises viewing the file using a viewer resident on a client computer of the user, the viewer permitting the user to control the presentation of the file including one or more of forwarding, reversing, pausing and stopping the sequence of frames.

5. The method of claim 3, wherein the step of creating the file comprises storing a URL associated with the web page with each image.

6. The method of claim 5 further comprising the user clicking on the URL associated with a frame in order to launch a web browser and load the web page associated with the URL.

7. The method of claim 2 further comprising generating, by the user, feedback to adjust the base reading speed of the graphical presentation.

8. A method for generating a graphical presentation of search results based on a search query, the method comprising:

generating, for each search result, a graphical frame representing the search result;

determining, for each search result, a predetermined display time during which the graphical frame is to be displayed based on a score associated with the particular search result; and combining the graphical frames to form a graphical presentation of the search results, wherein each graphical frame of the graphical presentation is displayed to the user for the predetermined display time associated with that graphical frame so that the user sees the more relevant search results for a longer period of time.

9. The method of claim 8, wherein determining the predetermined display time for each frame further comprises determining a default base reading speed corresponding to the speed that a user reads a web page, determining the number of words that appear in the particular frame, determining the score of the search result represented by the frame and combining the base reading speed, the number of words in the frame and the score of the frame to determine the predetermined display time for the frame.

10. The method of claim 8 further comprising executing a search based on a user query wherein executing the search further comprises retrieving the search results based on the query, extracting the web page corresponding to each search result as an image, and storing the images of the web pages and the predetermined display time for each image into a file.

11. The method of claim 10, wherein the step of creating the file comprises storing a URL associated with the web page with each image.

12. A method for visually displaying a graphical presentation of the actual search results based on a search query, the method comprising:

downloading a graphical presentation of the search results, the graphical presentation comprising, a graphical frame for each search result representing the search result and a predetermined display time during which the graphical frame is to be displayed based on a score associated with the particular search result; and displaying the graphical presentation of the search results to a user wherein each graphical frame of the graphical presentation is displayed to the user for the predetermined display time associated with that graphical frame so that the user sees the more relevant search results for a longer period of time.

13. The method of claim 12, wherein displaying the graphical presentation comprises viewing the file using a viewer resident on a client computer of the user, the viewer permitting the user to control the presentation of the file including one or more of forwarding, reversing, pausing and stopping the sequence of frames.

14. The method of claim 12 further comprising the user clicking on the URL associated with a frame in order to launch a web browser and load the web page associated with the URL.

15. A system for visually displaying a graphical presentation of the actual search results based on a search query, comprising:

means for generating, for each search result, a graphical frame representing the search result;

means for determining, for each search result, a predetermined display time during which the graphical frame is to be displayed based on a score associated with the particular search result;

means for combining the graphical frames to form a graphical presentation of the search results; and means for displaying the graphical presentation of the search results to a user wherein each graphical frame of the graphical presentation is displayed to the user for the predetermined display time associated with that graphical frame so that the user sees the more relevant search results for a longer period of time.

16. The system of claim 15, wherein determining the predetermined display time for each frame further comprises means for determining a default base reading speed corresponding to the speed that a user reads a web page, means for determining the number of words that appear in the particular frame, means for determining the score of the search result represented by the frame and means for combining the base reading speed, the number of words in the frame and the score of the frame to determine the predetermined display time for the frame.

17. The system of claim 15 further comprising means for executing a search based on a user query wherein executing the search further comprises means for retrieving the search results based on the query, means for extracting the web page corresponding to each search result as an image, and means for storing the images of the web pages and the predetermined display time for each image into a file.

18. The system of claim 17, wherein displaying the graphical presentation comprises means for viewing the file using a viewer resident on the a client computer of the user, the viewer permitting the user to control the presentation of the file including one or more of forwarding, reversing, pausing and stopping the sequence of frames.

19. The system of claim 18 further comprising means for clicking by the user on the URL associated with a frame in order to launch a web browser and load the web page associated with the URL.

20. The system of claim 16 further comprising means for generating, by the user, feedback to adjust the base reading speed of the graphical presentation.

21. An apparatus for generating a graphical presentation of search results based on a search query, comprising:

means for generating, for each search result, a graphical frame representing the search result;

means for determining, for each search result, a predetermined display time during which the graphical frame is to be displayed based on a score associated with the particular search result; and means for combining the graphical frames to form a graphical presentation of the search results, wherein each graphical frame of the graphical presentation is displayed to the user for the predetermined display time associated with that graphical frame so that the user sees the more relevant search results for a longer period of time.

22. The apparatus of claim 21, wherein determining the predetermined display time for each frame further comprises means for determining a default base reading speed corresponding to the speed that a user reads a web page, means for determining the number of words that appear in the particular frame, means for determining the score of the search result represented by the frame and means for combining the base reading speed, the number of words in the frame and the score of the frame to determine the predetermined display time for the frame.

23. The apparatus of claim 21 further comprising means for executing a search based on a user query wherein executing the search further comprises means for retrieving the search results based on the query, means for extracting the web page corresponding to each search result as an image, and means for storing the images of the web pages and the predetermined display time for each image into a file.

24. The apparatus of claim 23, wherein creating the file comprising means for storing a URL associated with the web page with each image.

25. An apparatus for visually displaying a graphical presentation of the actual search results based on a search query, the apparatus comprising:

means for downloading a graphical presentation of the search results, the graphical presentation comprising, a graphical frame for each search result representing the search result and a predetermined display time during which the graphical frame is to be displayed based on a score associated with the particular search result; and means for displaying the graphical presentation of the search results to a user wherein each graphical frame of the graphical presentation is displayed to the user for the predetermined display time associated with that graphical frame so that the user sees the more relevant search results for a longer period of time.

26. The apparatus of claim 25, wherein displaying the graphical presentation comprises means for viewing the file using a viewer resident on the a client computer of the user, the viewer permitting the user to control the presentation of the file including one or more of forwarding, reversing, pausing and stopping the sequence of frames.

27. The apparatus of claim 25 further comprising means for clicking by the user on the URL associated with a frame in order to launch a web browser and load the web page associated with the URL.

* * * * *